(12) United States Patent
Chiu et al.

(10) Patent No.: US 8,559,188 B2
(45) Date of Patent: Oct. 15, 2013

(54) MOUNTING APPARATUS FOR EXPANSION CARD

(75) Inventors: Po-Wen Chiu, New Taipei (TW); Wen-Hu Lu, Shenzhen (CN); Zhan-Yang Li, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 119 days.

(21) Appl. No.: 13/294,388

(22) Filed: Nov. 11, 2011

(65) Prior Publication Data
US 2012/0228244 A1    Sep. 13, 2012

(51) Int. Cl.
H05K 7/14    (2006.01)
H05K 7/20    (2006.01)

(52) U.S. Cl.
USPC ................ 361/801; 361/679.32; 361/810

(58) Field of Classification Search
USPC ............ 361/679.32, 752, 801–802, 807, 809, 361/810
See application file for complete search history.

(56) References Cited

U.S. PATENT DOCUMENTS

| | | | |
|---|---|---|---|
| 7,012,813 B2* | 3/2006 | Wang et al. | 361/801 |
| 7,203,067 B2* | 4/2007 | Beall et al. | 361/726 |
| 7,265,997 B2* | 9/2007 | Jing | 361/801 |
| 7,310,241 B2* | 12/2007 | Peng et al. | 361/801 |
| 7,443,666 B2* | 10/2008 | Huang | 361/679.32 |
| 2012/0145859 A1* | 6/2012 | Chiu et al. | 248/231.81 |
| 2012/0153101 A1* | 6/2012 | Li | 248/205.1 |
| 2012/0250278 A1* | 10/2012 | Li | 361/759 |
| 2012/0275849 A1* | 11/2012 | Fu et al. | 403/287 |

* cited by examiner

*Primary Examiner* — Anatoly Vortman
*Assistant Examiner* — Jacob Crum
(74) *Attorney, Agent, or Firm* — Altis & Wispro Law Group, Inc.

(57) ABSTRACT

A mounting apparatus includes a chassis, a mounting tray, a supporting tray, and a securing member rotatably attached to the supporting tray. The mounting tray secures a first end of an expansion card. The supporting tray includes a pivoting portion. The pivoting portion includes a blocking portion, and the blocking portion includes a front side and a back side. The securing member includes a driving portion. The securing member is rotatable relative to the supporting tray between a locked position and an unlocked position. In the locked position, the driving portion abuts the front side of the blocking portion, and the securing member and the supporting tray together sandwich the second end of the expansion card therebetween. In the unlocked position, the driving portion abuts the back side of the blocking portion, and the securing member is disengaged from the second end of the expansion card.

19 Claims, 6 Drawing Sheets

MOUNTING APPARATUS FOR EXPANSION CARD

BACKGROUND

1. Technical Field

The present disclosure relates to mounting apparatuses, and particularly to a mounting apparatus for securing expansion cards in an electronic device.

2. Description of Related Art

A computer system usually includes expansion cards, such as sound cards, video cards, graphics cards, etc., for enhancing the capabilities of the computer system. The expansion cards are often mounted to a computer casing of the computer system with screws. However, using screws to attach the expansion cards is laborious and time consuming.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
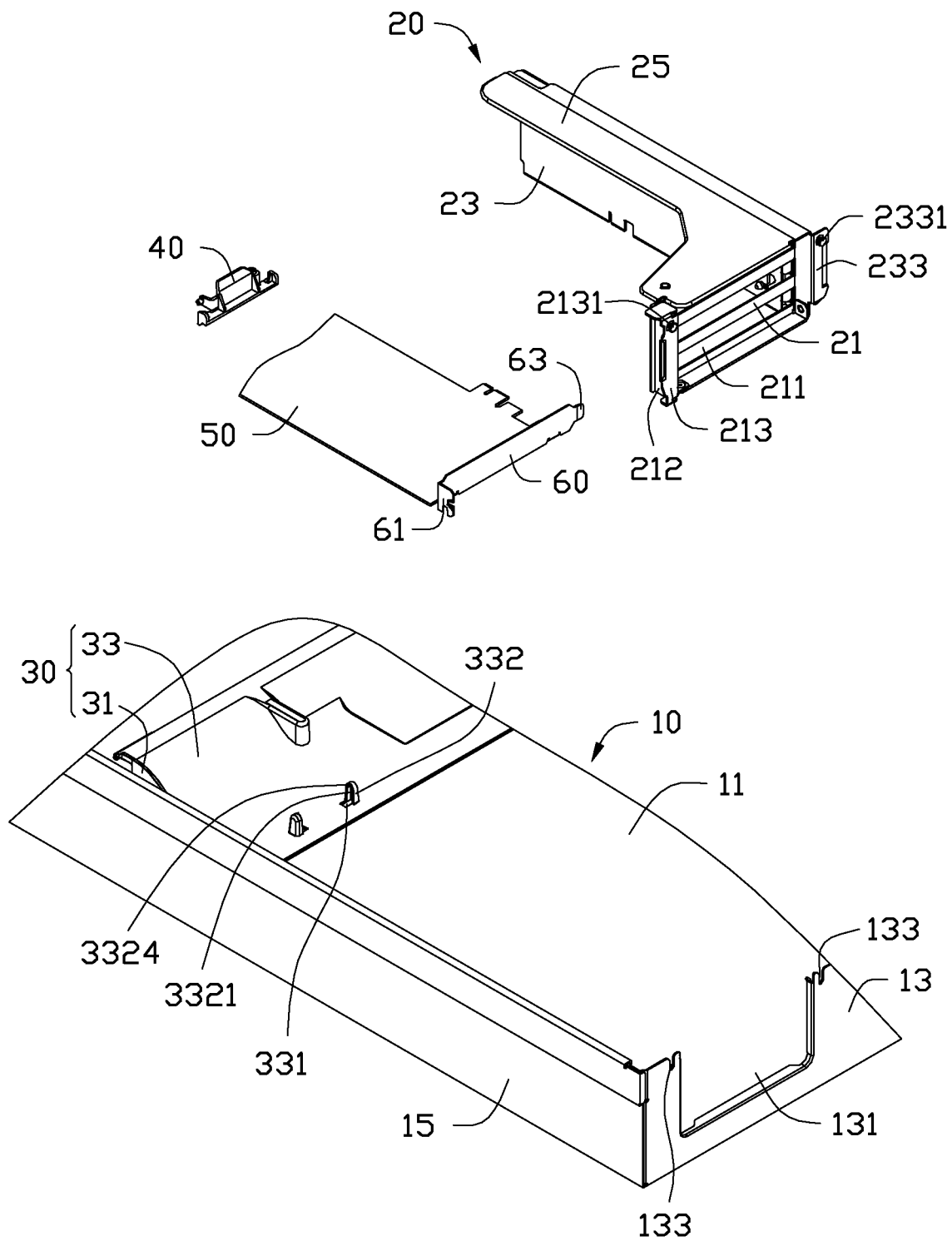
FIG. 1 is a partially exploded, cutaway view of a mounting apparatus and an expansion card in accordance with an embodiment.

Referring to FIG. 1, a mounting apparatus in accordance with an embodiment is capable of securing an expansion card 50. The mounting apparatus of an embodiment includes a chassis 10, a mounting tray 20, a supporting tray 30 received in the chassis 10, and a securing member 40 rotatably attached to the supporting tray 30. The expansion card 50 may be, for example, one or more sound cards, video cards, or graphics cards, or other peripheral component interconnection (PCI) cards.

A mounting member 60 is attached to a front portion of the expansion card 50. A flange 61 is located at a first end of the mounting member 60, and an insertion portion 63 extends from a second end of the mounting member 60.

The chassis 10 includes a bottom plate 11, a front plate 13 connected to the bottom plate 11, and a side plate 15. In one embodiment, the bottom plate 11 is substantially perpendicular to the front plate 13. An opening 131 and two notches 133 are defined in the front plate 13. The two notches 133 are arranged in or on opposite sides of the opening 131.

The mounting tray 20 includes a front panel 21, a side panel 23, and a top panel 25. The top panel 25 is connected to the front panel 21 and the side panel 23. In one embodiment, the top panel 25 is substantially perpendicular to the front panel 21 and the side panel 23. A retaining panel 212 is connected to the front panel 21. The retaining panel 212 and the front panel 21 cooperatively define three expansion slots 211. A first mounting panel 213, with a first mounting post 2131, is connected to the retaining panel 212. A second mounting panel 233 extends from the side panel 23. The second mounting panel 233 includes a second mounting post 2331. Three receiving holes (not shown), adjacent to the second mounting panel 233, are defined in the side panel 23, for receiving the insertion portions 63.

The supporting tray 30 includes a securing plate 31 attached to the side plate 15, and a supporting plate 33 connected to the securing plate 31. Two slots 331, arranged in a straight line, are defined in the supporting plate 33. A pivoting portion 332, with a pivoting hole 3321, is located on an edge of each slot 331. A blocking portion 3324 (shown in FIG. 4), is located on a top portion of each pivoting portion 332. In one embodiment, the pivoting hole 3321 communicates with the slot 331, and the supporting tray 30 may be a guiding duct for guiding air flowing in the chassis 10.

Figure 2:
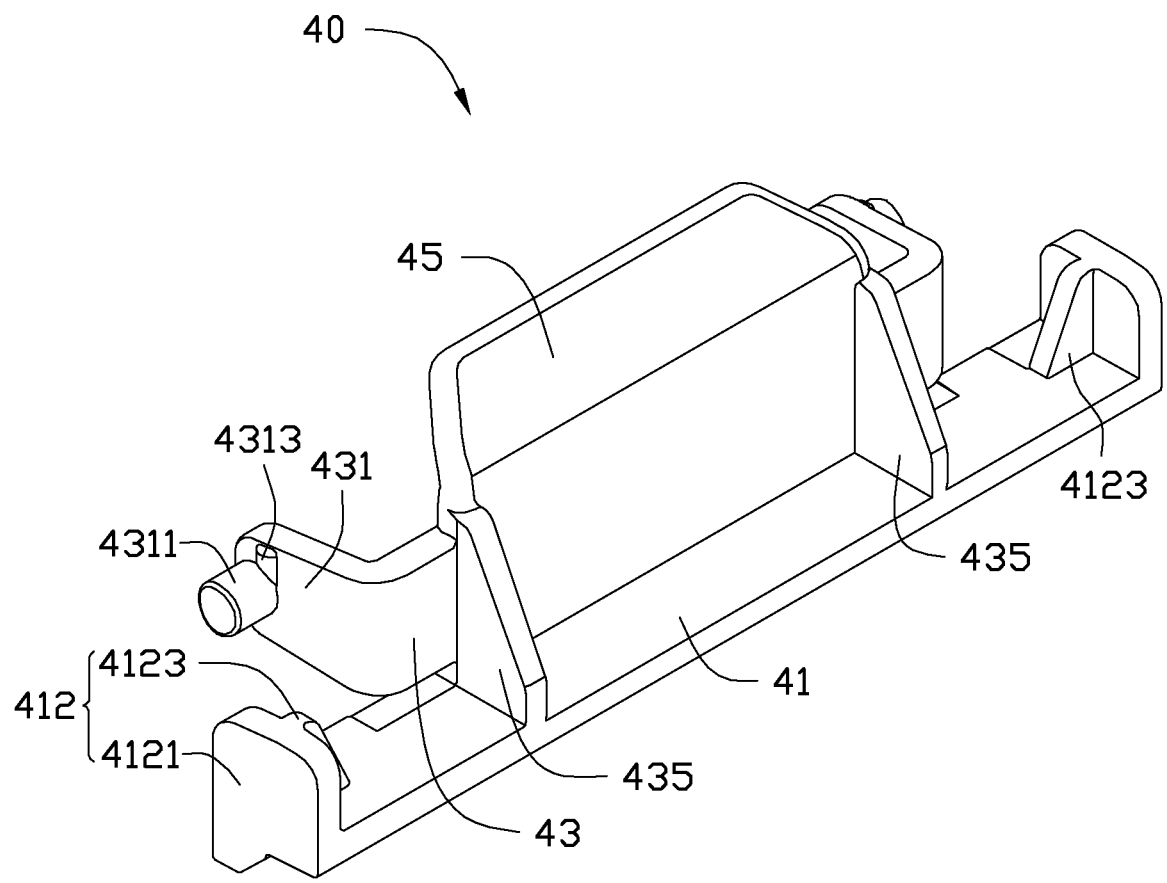
FIG. 2 is an isometric view of a securing member of the mounting apparatus of FIG. 1.

Referring to FIG. 2, the securing member 40 includes a main body 41, a connecting plate 43 connected to the main body 41, and an operating plate 45 extending from the connecting plate 43. In one embodiment, the connecting plate 43 is substantially perpendicular to the main body 41. Two reinforcing portions 412 are located on opposite ends of the main body 41. Each reinforcing portion 412 includes a retaining plate 4121 and a first rib 4123 connected to the retaining plate 4121. In one embodiment, the first rib 4123 is triangular and substantially perpendicular to the retaining plate 4121. Two extending arms 431, each with a pivoting post 4311, extend from the opposite ends of the connecting plate 43. A driving portion 4313 is located on an outer surface of each extending arm 431 and connected to the pivoting post 4311. The pivoting post 4311 is substantially perpendicular to the outer surface of the extending arm 431. A second rib 435 is connected to the connecting plate 43 and the main body 41.

Figure 3:
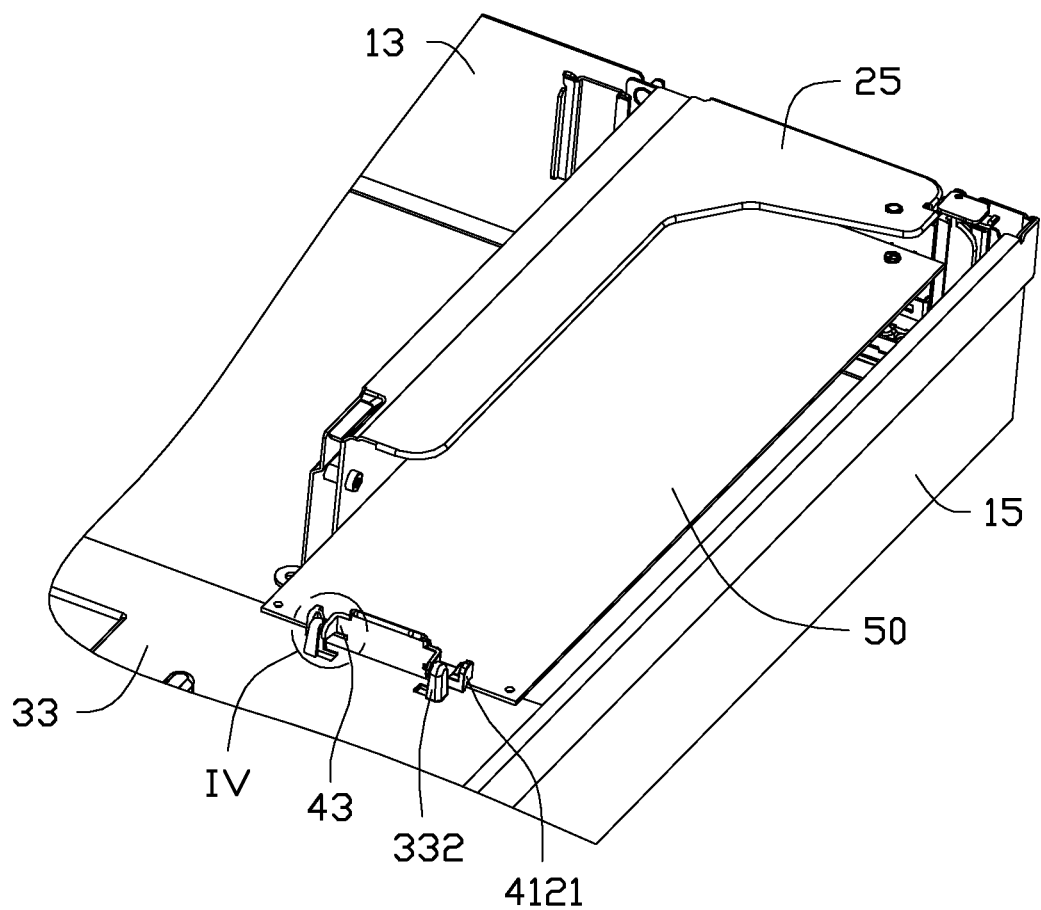
FIG. 3 is an assembled view of the mounting apparatus of FIG. 2.
Figure 4:
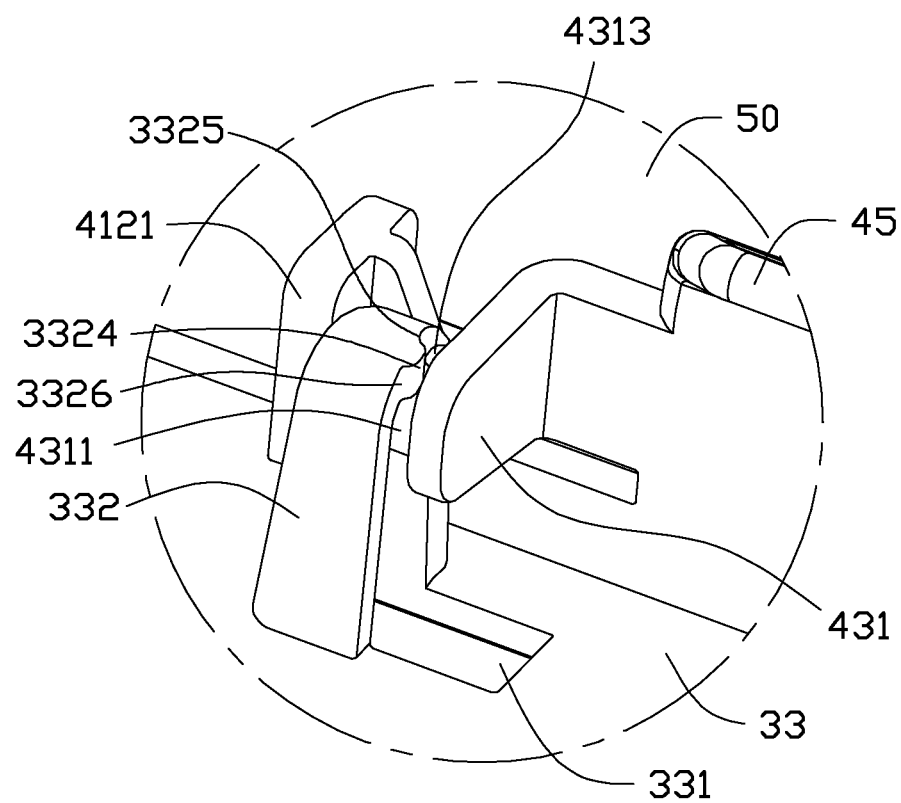
FIG. 4 is an enlarge view of a circled portion IV of FIG. 3.
Figure 5:
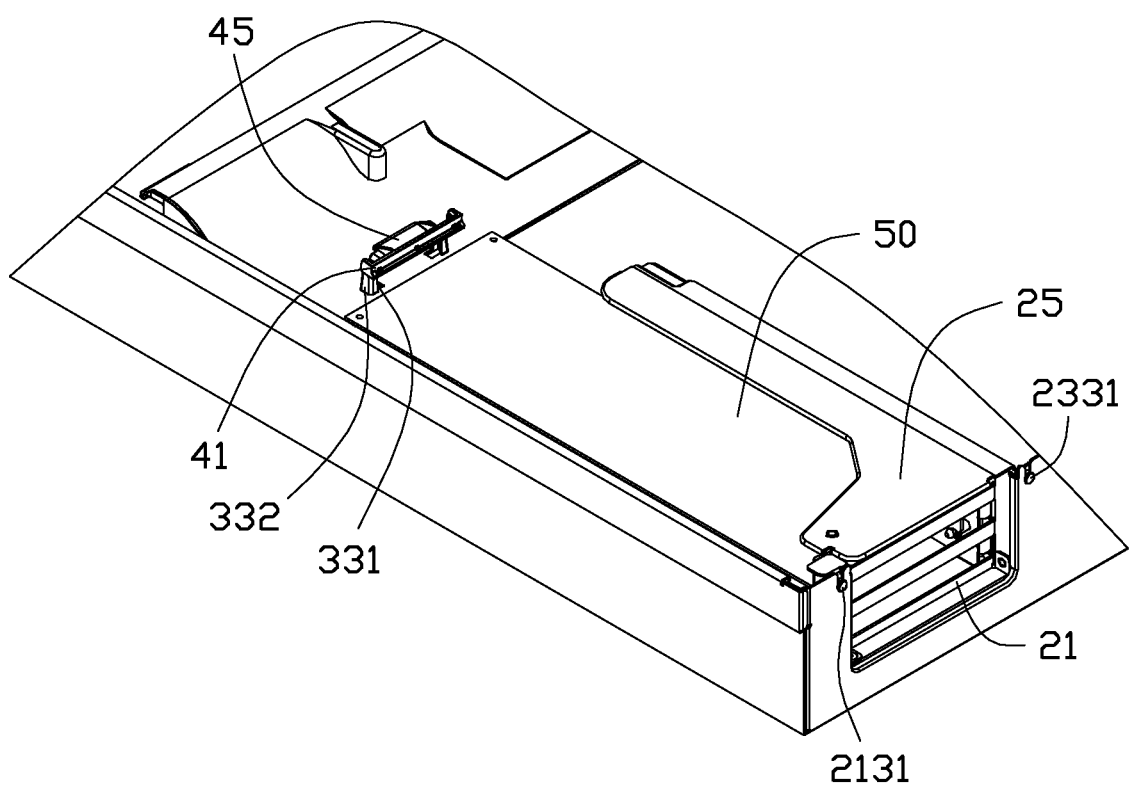
FIG. 5 is similar to FIG. 3, but viewed in a different aspect, and the securing member being located in an unlocked position.
Figure 6:
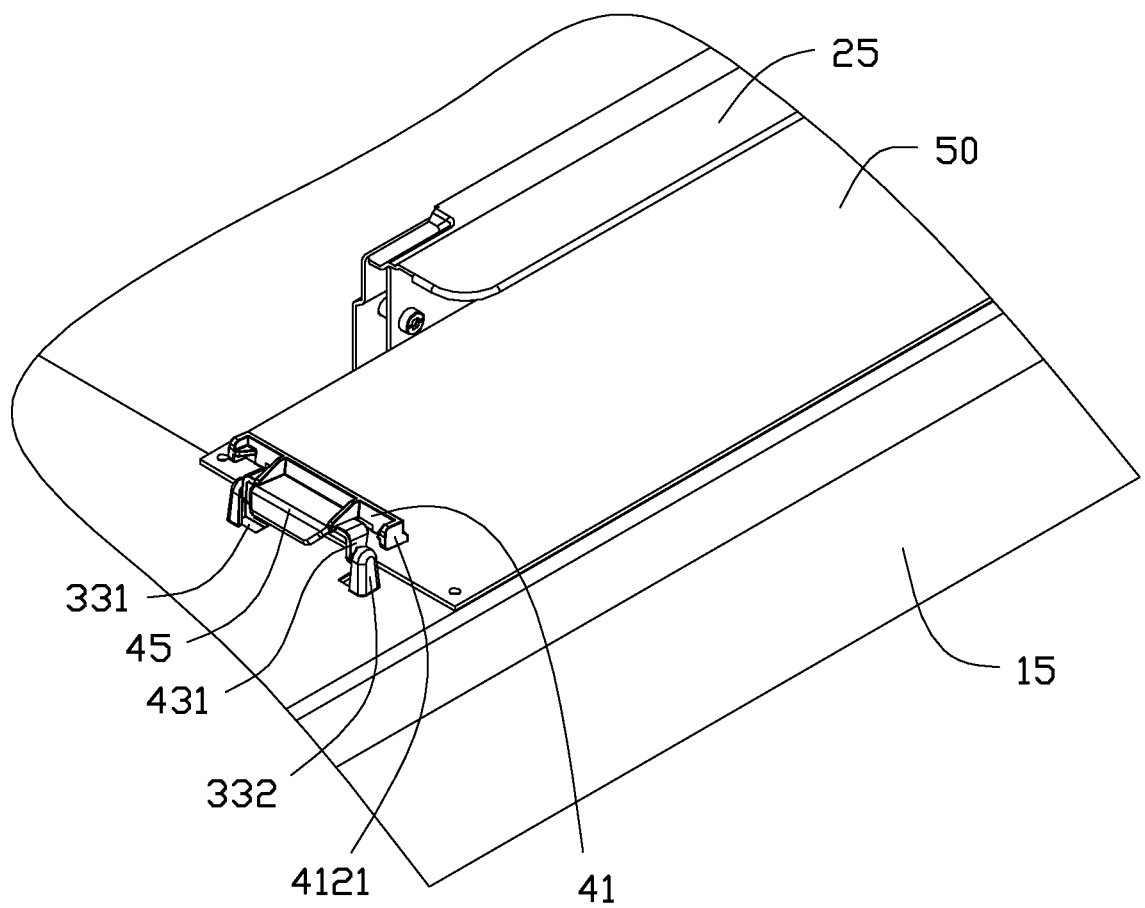
FIG. 6 is similar to FIG. 5, but the securing member being located in a locked position.

Referring to FIGS. 3-4, in assembly, the mounting tray 20 is accommodated in the opening 131. The first and second mounting posts 2131, 2331 are inserted into the two notches 133, to mount the mounting tray 20 to the chassis 10.

The expansion card 50 is received in the mounting tray 20, and the mounting member 60 is positioned in one of the expansion slots 211. The insertion portion 63 is inserted into one of the receiving holes of the side panel 23. The flange 61 is mounted to the retaining panel 212 by known means, such as with screws or by jointing. The expansion card 50 is supported by the supporting plate 33 and adjacent to the two pivoting portions 332.

The pivoting posts 4311 are received in the corresponding pivoting holes 3321, to rotatably engage the securing member 40 with the two pivoting portions 332. The securing member 40 is rotatable about the pivoting posts 4311 relative to the two pivoting portions 332 between a locked position and an unlocked position. Referring to FIG. 4, the blocking portion 3324 includes a front side 3325 adjacent to the expansion card 50 and a back side 3326 opposite to the front side 3325. In the locked position, the driving portions 4313 abut the front side 3325 of the corresponding blocking portion 3324. In the unlocked position, the driving portions 4313 abut the back side 3326 of the corresponding blocking portion 3324.

The securing member 40 is rotated away from the supporting plate 33 in the unlocked position, so that each driving portions 4313 abuts the back side 3326 of the corresponding blocking portion 3324. The operating plate 45 is operated to rotate the securing member 40 about the pivoting post 4311 towards the expansion card 50. The driving portions 4313 are passed through the blocking portions 3324 until in the locked position, so that they are located on the front side 3325 of corresponding blocking portion 3324. Therefore, the main body 41 abuts a top surface of the expansion card 50, and the expansion card 50 is located between the main body 41 and the supporting plate 33. In one embodiment, the main body 41 is substantially parallel to the supporting plate 33 when the securing member 40 is in the locked position.

In disassembly, the operating plate 45 is operated to rotate the securing member 40 about the pivoting posts 4311 from the locked position to the unlocked position The driving portion 4313 is rotated away from the expansion card 50 and located in the back side 3326 of the corresponding blocking portion 3324. When the main body 41 is disengaged from the expansion card 50, the expansion card 50 may be moved to disengage the insertion portions 63 from the receiving holes of the side panel 23, and the flange 61 can be detached from the retaining panel 212, and the expansion card 50 may then be detached from the mounting tray 20.

It is to be understood, however, that even though numerous characteristics and advantages have been set forth in the foregoing description of embodiments, together with details of the structures and functions of the embodiments, the disclosure is illustrative only and changes may be made in detail, especially in matters of shape, size, and arrangement of parts within the principles of the disclosure to the full extent indicated by the broad general meaning of the terms in which the appended claims are expressed.

What is claimed is:

1. A mounting apparatus comprising:
a chassis comprising a bottom plate;
a mounting tray received in the chassis, the mounting tray securing a first end of an expansion card;
a supporting tray attached to the chassis and supporting a second end of an expansion card; the supporting tray comprising a supporting plate substantially parallel to the bottom plate and a pivoting portion perpendicularly extending from the supporting plate, the pivoting portion comprising a blocking portion, and the blocking portion comprising a front side and a back side opposite to the front side;
a securing member rotatably attached to the pivoting portion; the securing member comprising a driving portion;
wherein the securing member is rotatable relative to the supporting tray between a locked position and an unlocked position; if the securing member is located in the locked position, the driving portion abuts the front side of the blocking portion, and the securing member and the supporting tray cooperatively secure the second end of the expansion card therebetween; and if the securing member is located in the unlocked position, the driving portion abuts the back side of the blocking portion, and the securing member is disengaged from the second end of the expansion card.

2. The mounting apparatus of claim 1, wherein the securing member further comprises a main body abuting the second end of the expansion card, and the main body is substantially parallel to the supporting plate when the securing member is located in the locked position.

3. The mounting apparatus of claim 2, wherein the securing member further comprises a connecting plate connected to the main body, the connecting plate comprises an extending arm, and the driving portion is located on an outer surface of the extending arm.

4. The mounting apparatus of claim 3, wherein the connecting plate is substantially perpendicular to the main body.

5. The mounting apparatus of claim 3, wherein the extending arm comprises a pivoting post rotatably engaged with the pivoting portion, and the securing member is rotatable about the pivoting post.

6. The mounting apparatus of claim 5, wherein the pivoting post is substantially perpendicular to the outer surface of the extending arm.

7. The mounting apparatus of claim 5, wherein the pivoting portion defines a pivoting hole receiving the pivoting post, and the supporting plate defines a slot communicating with the pivoting hole.

8. The mounting apparatus of claim 7, wherein the blocking portion extends from a top portion of the pivoting portion.

9. The mounting apparatus of claim 1, wherein the supporting tray is an air guiding duct.

10. A mounting apparatus comprising:
a chassis comprising a bottom plate;
a mounting tray received in the chassis, the mounting tray secures a first end of an expansion card;
a supporting tray attached to the chassis and supporting a second end of an expansion card; the supporting tray comprising a supporting plate substantially parallel to the bottom plate and a pivoting portion perpendicularly extending from the supporting plate, the pivoting portion defining a pivoting hole and comprising a blocking portion located at an entrance of the pivoting hole;
a securing member rotatably attached to the supporting tray; the securing member comprising a pivoting post and a driving portion adjacent to the pivoting post; the pivoting post rotatably received in the pivoting hole;
wherein the securing member and the supporting tray cooperatively sandwich the second end of the expansion card therebetween, and the driving portion abuts the blocking portion to prevent the securing member from being rotated away from the expansion card.

11. The mounting apparatus of claim 10, wherein the supporting plate defines a slot, and the slot communicates with the pivoting hole.

12. The mounting apparatus of claim 10, wherein the securing member further comprises a main body abuting the second end of the expansion card, the main body is substantially parallel to the supporting plate.

13. The mounting apparatus of claim 12, wherein the securing member further comprises a connecting plate connected to the main body, the connecting plate comprises an extending arm, and the driving portion is located on an outer surface of the extending arm.

14. The mounting apparatus of claim 13, wherein the connecting plate is substantially perpendicular to the main body.

15. The mounting apparatus of claim 13, wherein the pivoting post is substantially perpendicular to the outer surface of the extending arm.

16. The mounting apparatus of claim 13, wherein the securing member comprises a rib, and the rib is substantially perpendicular to the connecting plate and the main body.

17. The mounting apparatus of claim 16, wherein the rib is a triangle.

18. The mounting apparatus of claim 10, wherein the supporting tray is an air guiding duct.

19. A mounting apparatus comprising:
a chassis;

a mounting tray received in the chassis, the mounting tray securing a first end of an expansion card;

a supporting tray attached to the chassis and supporting a second end of an expansion card; the supporting tray comprising a supporting plate and a pivoting portion located on the supporting plate; the pivoting portion defining a pivoting hole; the supporting plate defining a slot communicating with the pivoting hole; the pivoting portion comprising a blocking portion, and the blocking portion comprising a front side and a back side opposite to the front side; and a securing member rotatably attached to the supporting tray; the securing member comprising a main body abutting the second end of the expansion card and a connecting plate substantially perpendicular to the main body; the connecting plate comprising an extending arm, and a driving portion located on an outer surface of the extending arm;

wherein the securing member is rotatable relative to the supporting tray between a locked position and an unlocked position; when the securing member is located in the locked position, the driving portion abuts the front side of the blocking portion, the main body is substantially parallel to the supporting plate, and the securing member and the supporting tray cooperatively secure the second end of the expansion card therebetween; and when the securing member is located in the unlocked position, the driving portion abuts the back side of the blocking portion, and the securing member is disengaged from the second end of the expansion card.

* * * * *